United States Patent
Soderlind

(10) Patent No.: US 7,681,863 B1
(45) Date of Patent: Mar. 23, 2010

(54) ELECTROMAGNETIC FLOW-THROUGH VALVE

(75) Inventor: Dana Soderlind, 209 Segars Rd., Winder, GA (US) 30680

(73) Assignee: Dana Soderlind, Winder, GA (US)

(*) Notice: Subject to any disclaimer, the term of this patent is extended or adjusted under 35 U.S.C. 154(b) by 445 days.

(21) Appl. No.: 11/562,652

(22) Filed: Nov. 22, 2006

Related U.S. Application Data

(63) Continuation-in-part of application No. 10/820,939, filed on Sep. 22, 2005, now abandoned.

(51) Int. Cl.
    *F16K 31/02* (2006.01)
(52) U.S. Cl. .................. 251/129.21; 251/129.09; 239/DIG. 11
(58) Field of Classification Search .......... 251/129.09, 251/129.15, 129.21; 239/DIG. 11
    See application file for complete search history.

(56) References Cited

U.S. PATENT DOCUMENTS

| | | | |
|---|---|---|---|
| 4,488,573 A * | 12/1984 | Runyan et al. | 137/375 |
| 5,640,987 A * | 6/1997 | Sturman | 137/1 |
| 5,787,915 A * | 8/1998 | Byers et al. | 137/1 |
| 5,937,904 A * | 8/1999 | Wunder | 137/625.65 |
| 6,242,994 B1 * | 6/2001 | Li et al. | 335/277 |

* cited by examiner

*Primary Examiner*—John K Fristoe, Jr.
(74) *Attorney, Agent, or Firm*—Womble Carlyle Sandridge & Rice, PLLC

(57) ABSTRACT

An electromagnetic valve assembly for controlling the flow of a fluid in a sprinkler system. The electromagnetic valve includes a valve core including a plurality of orifices for a passage of fluid therethrough; a directional housing enclosing the valve core and enabling a controllable, lateral movement of the valve core from a closed position to an open position; a plurality of seals positioned within the directional housing to prevent leakage of the fluid; and a plurality of magnet cores attached adjacent to the directional housing, each magnet core including a wire winding for generating an electromagnetic field when actuated by means of an electrical current. When the generated electromagnetic field is applied to a first magnet core, the valve core slides laterally into the first magnet core to an open position enabling the flow of water through the orifices and an opening of the directional housing. When the generated electromagnetic field is applied to a second magnet core, the valve core slides laterally into the second magnet core to a closed position stopping the flow of water through the orifices and the opening of the directional housing.

16 Claims, 7 Drawing Sheets

ELECTROMAGNETIC FLOW-THROUGH VALVE

CROSS REFERENCE TO RELATED APPLICATION

The present patent application is continuation-in-part of patent application entitled "Flow Through Sprinkler Valve," filed on Sep. 22, 2005, as U.S. patent application Ser. No. 10/820,939, now abandoned by the inventor named in this patent application. The specification and drawings of the patent application are specifically incorporated herein by reference.

BACKGROUND OF THE INVENTION

This present invention relates generally to electromagnetic valves and, more particularly, to electromagnetic valves for a residential or commercial fire suppression sprinkler system. Electromagnetic valves and actuator systems are known in the art. For example, U.S. Pat. No. 6,199,823 to Dahlgren, et al. teaches a solenoid actuated valve that includes a valve body and a sleeve armature slidably mounted on the valve body for movement between a flow preventing position and positions away from the flow preventing position. The movement of the sleeve armature between closed and open positions is controlled by first and second solenoid coils. The sleeve armature is maintained in the position to which it has been driven by residual magnetism. The solenoid actuated valve can include a bias structure for urging the sleeve armature toward the closed position. The solenoid actuated fluid flow control valve is described with reference to an application for inflating inflatable restraints for the occupants of a vehicle.

An example of an electromagnetic actuator and control is U.S. Pat. No. 7,128,032 to Froeschle, et al. that teaches an electromagnetic actuator including a stator assembly mounted to a center pole formed of material having high magnetic permeability. When current is applied to one or more coils within the stator assembly, a magnetic field is generated that interacts with a magnetic field generated by one or more magnets disposed within the armature assembly and causes the armature to move relative to the center pole to open or close an intake or exhaust valve in an internal combustion engine.

Recent examples of electromagnetic valves include U.S. Pat. No. 7,126,449 to Nickel, et al., U.S. Pat. No. 7,114,472 to Kondo, and U.S. Pat. No. 7,097,149 to Ott. None of these references teaches an electromagnetic flow-through valve that can be used as part of a sprinkler system to suppress fires, particularly in residential homes, condominiums or apartments.

Although the use of smoke and fire detector alarms have become quite common in residences today, and are easily installed by the homeowner, the same cannot be said of sprinkler systems that work in conjunction with the smoke and fire alarm to deliver pressurized water in the room or rooms that are affected. High end homes, apartments and condominiums are most likely to have a sprinkler system installed because of the high associated property values.

There is a need for a low cost, effective automatic sprinkler system that can be installed easily and that can operate in conjunction with the smoke and fire alarm in a residence.

SUMMARY OF THE INVENTION

The electromagnetic multifunctional valve of the present invention is an electromagnetic device that directs fluid through a valve core to efficiently and effectively emit water to various areas of a person's residential property depending upon the location of the installation. The position of the valve is controlled by the application of an electromagnetic field generated by applying current to a first or second winding around a first magnet core or a second magnet core, each magnet core having a hollow, tubular structure to allow movement of the valve core into either of the magnet cores depending on which magnet core is activated. The electromagnetic valve assembly allow water under pressure to flow through the valve core in an uninterrupted manner when the valve opens by using an electromagnetic field generated by current flowing in the first winding to move the valve laterally towards and into the first magnet core exposing orifices on the periphery of the valve which are aligned with an opening in the directional housing for pressurized water dispersal. The electromagnetic valve stops the flow through the valve core when the valve closes by using an electromagnetic field generated by current flowing in the second winding to move the valve laterally toward and into the second magnet core. Fluid seals are used on both sides of the valve core to prevent leakage and/or contamination.

The valve core and outer, cylindrical thermoplastic casings can be fabricated from durable materials to make the valve suitable for both internal and external uses in all types of weather conditions. The cylindrical casings include two full length segments with semi-circular cross-sections that are joined together for closure around the valve assembly. Furthermore, the dimensions of the valve including both diameter and length can vary greatly depending on the particular intended use of the valve.

The electromagnetic valve can provide both a restricted flow port and a continuous flow port by using several seals that are activated by generating the electromagnetic field.

In one aspect of the invention, an electromagnetic valve assembly is provided for controlling the flow of a fluid in a sprinkler system. The electromagnetic valve includes a valve core including a plurality of orifices for a passage of fluid therethrough; a directional housing enclosing the valve core and enabling a controllable, lateral movement of the valve core in the directional housing from a closed position to an open position; a plurality of seals positioned within the directional housing to prevent leakage of the fluid; and a plurality of magnet cores attached adjacent to the directional housing, each magnet core including a wire winding for generating an electromagnetic field when actuated by means of an electrical current. When the generated electromagnetic field is applied to a first magnet core, the valve core slides laterally towards and into the first magnet core to an open position enabling the flow of fluid through the orifices of the valve core and through an opening of the directional housing. When the generated electromagnetic field is applied to a second magnet core, the valve core slides laterally towards and into the second magnet core to a closed position stopping the flow of fluid through the orifices of the valve core and the opening of the directional housing.

In another aspect of the invention, an electromagnetic flow-through sprinkler valve is provided for directing a flow of fluid to an area upon receiving an electrical signal for actuation from a sensor. The flow-through sprinkler valve includes a valve core including a plurality of orifices around an outer surface for a passage of fluid therethrough; a directional housing including an outlet for a directional dispersal of fluid when the orifices of the valve core are aligned with the outlet, the directional housing enclosing the valve core and enabling lateral movement of the valve core in the directional housing; and a plurality of tubular magnet cores attached adjacent to the directional housing on opposite ends of the housing, a first magnet core including a wire winding for generating an electromagnetic field when an electrical current is applied to the wire winding on the first magnet core in response to the electrical signal from the sensor. The electromagnetic field causes the magnetic valve core to move laterally towards and into the first magnet core and enables the flow of water through the orifices of the valve core and through the outlet of the directional housing.

BRIEF DESCRIPTION OF THE DRAWINGS

These and other advantages and aspects of the present invention will become apparent and more readily appreciated from the following detailed description of the invention taken in conjunction with the accompanying drawings, as follows.

DETAILED DESCRIPTION OF THE INVENTION

The following description of the invention is provided as an enabling teaching of the invention and its best, currently known embodiment. Those skilled in the relevant art will recognize that many changes can be made to the embodiments described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and may even be desirable in certain circumstances, and are a part of the present invention. Thus, the following description is provided as illustrative of the principles of the present invention and not in limitation thereof, since the scope of the present invention is defined by the claims.

Figure 1:
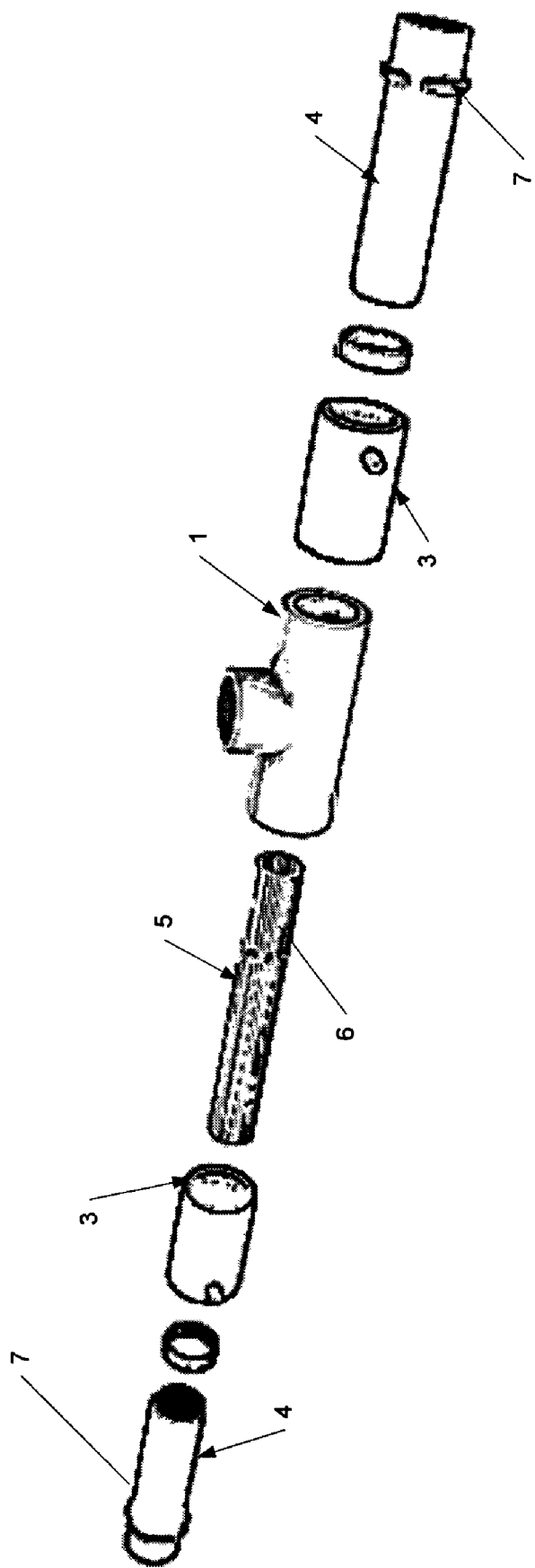
FIG. 1 is an exploded view of the components of the electromagnetic flow-through valve in accordance with an exemplary embodiment of the invention.

As illustrated in FIG. 1, the electromagnetic flow-through valve of the invention includes a hollow, cylindrical valve core 5 contained within a valve core directional housing 1. The cylindrical valve core 5 includes orifices 6 drilled on opposite sides of the valve core allowing fluid through the orifices when activated by an electromagnetic valve switching connector (not shown). In addition, the cylindrical valve core 5 includes a pair of ring-shaped seals 2 inserted inside and on opposite ends of the cylindrical valve core 5 to prevent the leakage of water into other parts of the electromagnetic valve thereby maximizing flow to the valve core orifices 6.

The electromagnetic flow-through valve assembly includes two magnet cores 3 on opposite sides of the valve core directional housing 1. Each magnet core 3 includes a copper magnet wire winding (not shown) around its entire circumference. The copper magnet wire winding receives signals from the electrical connector (not shown), which in turn directs current flow to one of the copper magnet wire windings thereby generating an electromagnetic field that activates the corresponding magnet. Activating the corresponding magnet core causes the cylindrical valve core 5 to be moved laterally towards and into the magnet core (valve open position) enabling water to flow through the orifices 6. Directing current to the second copper magnet wire winding generates an electromagnetic field that activates the second magnet core thereby causing the cylindrical valve core 5 to move laterally towards and into the second magnet core (valve closed position) stopping the flow of water through the orifices 6.

The fluid is channeled through a valve dispenser opening 4, and released through the orifices 6 once signaled by the copper magnetic wire winding. The electromagnetic flow-through valve can be powered by various sources including a battery, solar power or an electrical connection from the main electrical source in the dwelling.

Figure 2:
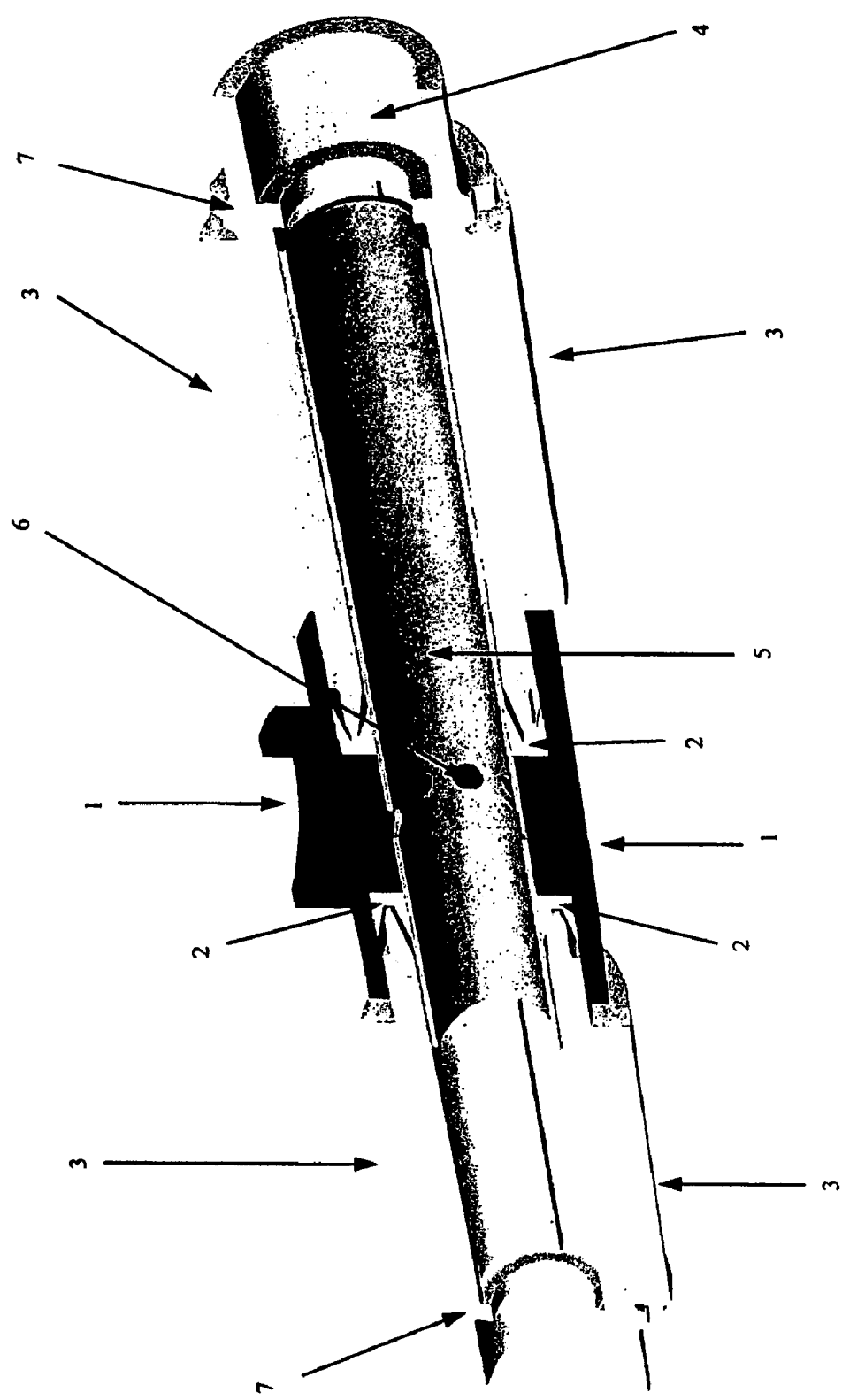
FIG. 2 is a transverse sectional view of the electromagnetic flow-through valve in accordance with an exemplary embodiment of the invention.

As illustrated in FIG. 2, when the valve core 5 is in the open position, the valve core directional housing 1 and ring seals 2 direct the flow of fluid from the valve opening 4 to the orifices 6 and through the opening in the valve core directional housing 1.

Disposed adjacent to the valve core directional housing 1 with internal ring seals 2 are the two tubular and hollow magnet cores 3. The copper magnet wire winding is wound around the circumference of each magnet core 3.

Figure 3:
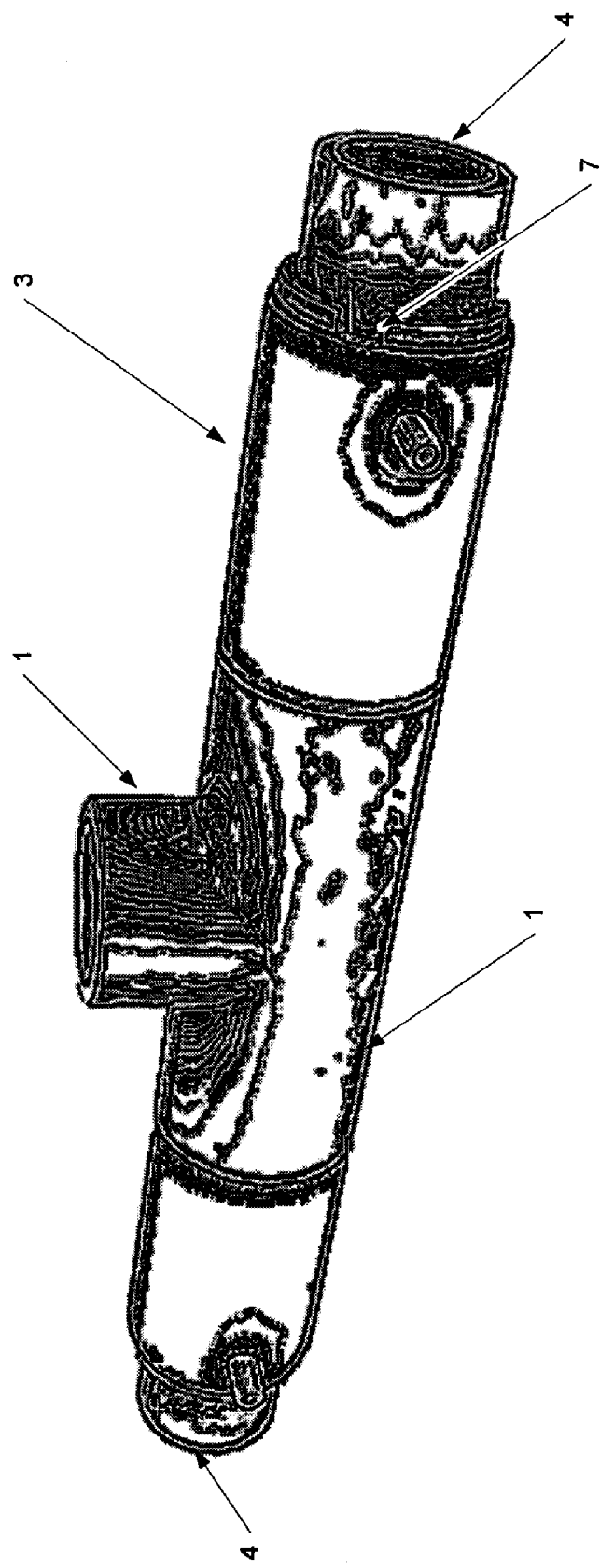
FIG. 3 is a perspective view of the electromagnetic flow-through valve with the outer casing removed in accordance with an exemplary embodiment of the invention.

FIG. 3 is a perspective view of the electromagnetic flow-through valve with the outer casing removed. As illustrated in FIG. 3, the valve core directional housing 1 is connected to the magnet cores 3. Further attached to each of the magnet cores 3 is a valve core stopper 7 which prevents movement of the valve core past the corresponding valve open or closed positions. The valve core stoppers are attached to valve openings 4 on each end of the electromagnetic flow-through valve assembly.

Figure 4:
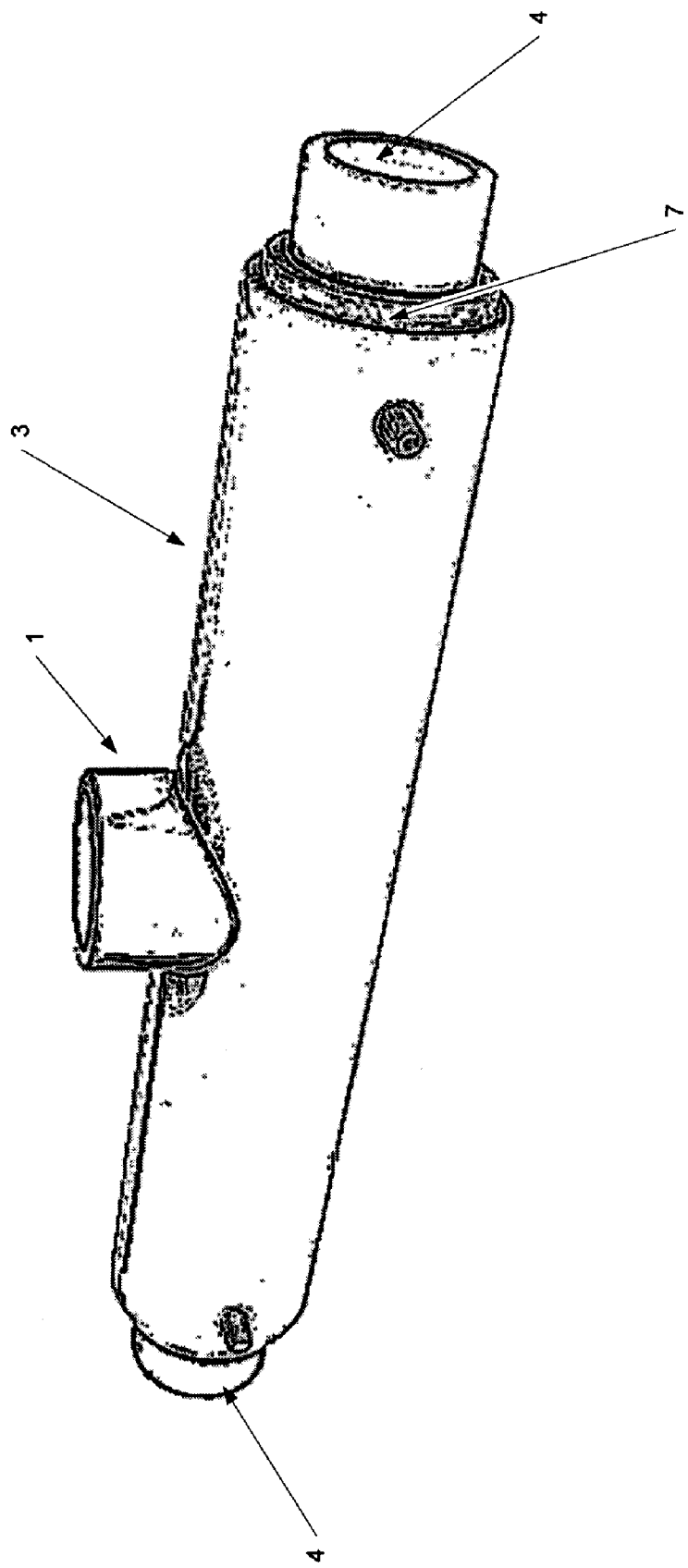
FIG. 4 is a perspective view of the electromagnetic flow-through valve with the outer casing in accordance with an exemplary embodiment of the invention.

The entire apparatus is contained within a cylindrical casing that can be made from a variety of thermoplastic materials including, but not limited to, polyvinyl chloride (PVC), acrylnitrile-butadiene-styrene (ABS), chlorinated polyvinyl chloride (CPVC), or polyvinylideneflouride (PVDF). FIG. 4 is a perspective view of the electromagnetic flow-through valve with the outer casing.

In operation, the electromagnetic valve can be installed in the trim between walls and the ceiling inside a room of a residence. In the event of a fire, the smoke and fire alarm sensor would activate, sounding an audible high-pitched alarm and transmitting a signal to the electromagnetic valve to open. The electromagnetic valve, upon receiving the signal for the valve to open, sends current through the copper magnet wire winding surrounding the first magnet core thereby generating an electromagnetic field that activates the first magnet core to pull the valve core towards and into the first magnet core. When the fire is extinguished, the smoke and fire alarm sensor stops the audible alarm and transmits another signal to the electromagnetic valve to close. Upon receiving the signal for the valve to close, the electromagnetic valve sends current through the copper magnet wire winding surrounding the second magnet core thereby generating an electromagnetic field that activates the second magnet core to pull the valve core towards and into the second magnet core. The electromagnetic flow-through valve provides the advantage of automatically cutting off water flow when the condition giving rise to the smoke and fire alarm has been suppressed. The benefits are lower insurance claims and less cleanup resulting from reduced fire and water damage to the premises.

Figure 5:
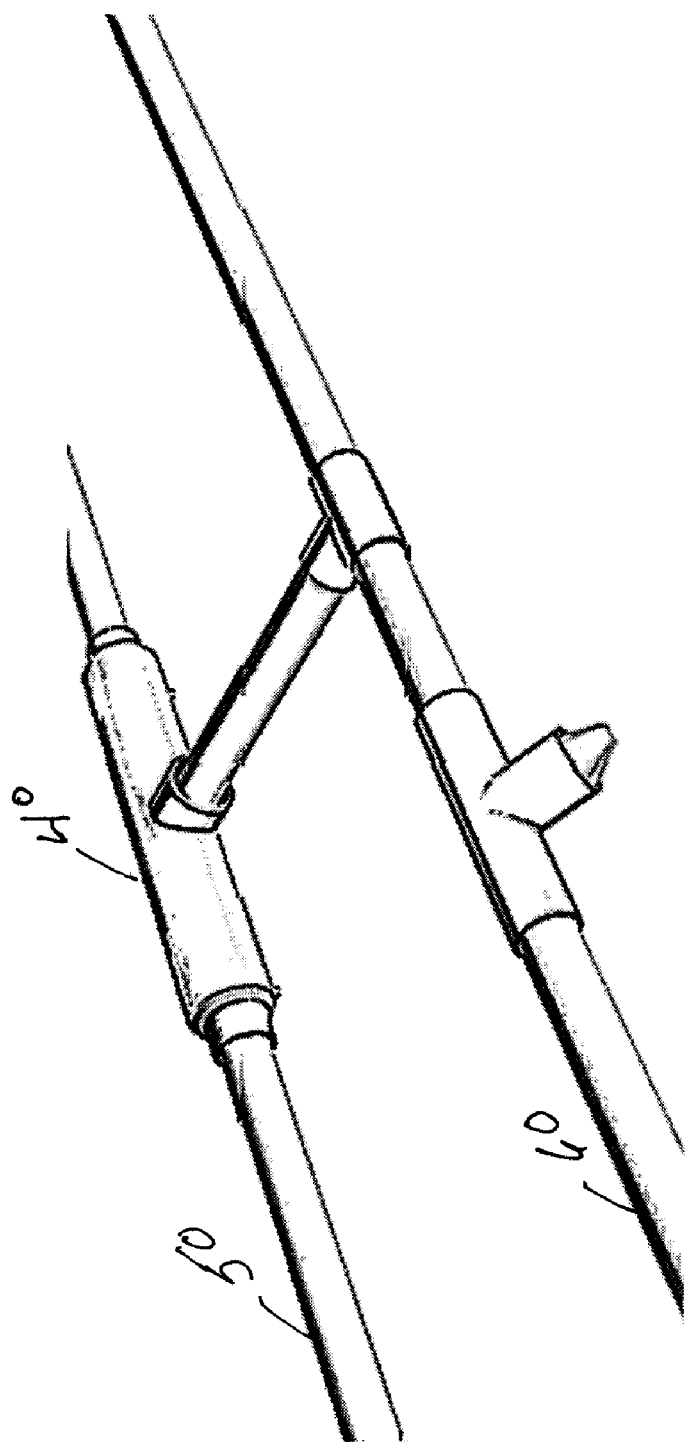
FIGS. 5-7 illustrate an application of the electromagnetic flow-through valve to an external structure of a dwelling.
Figure 6:
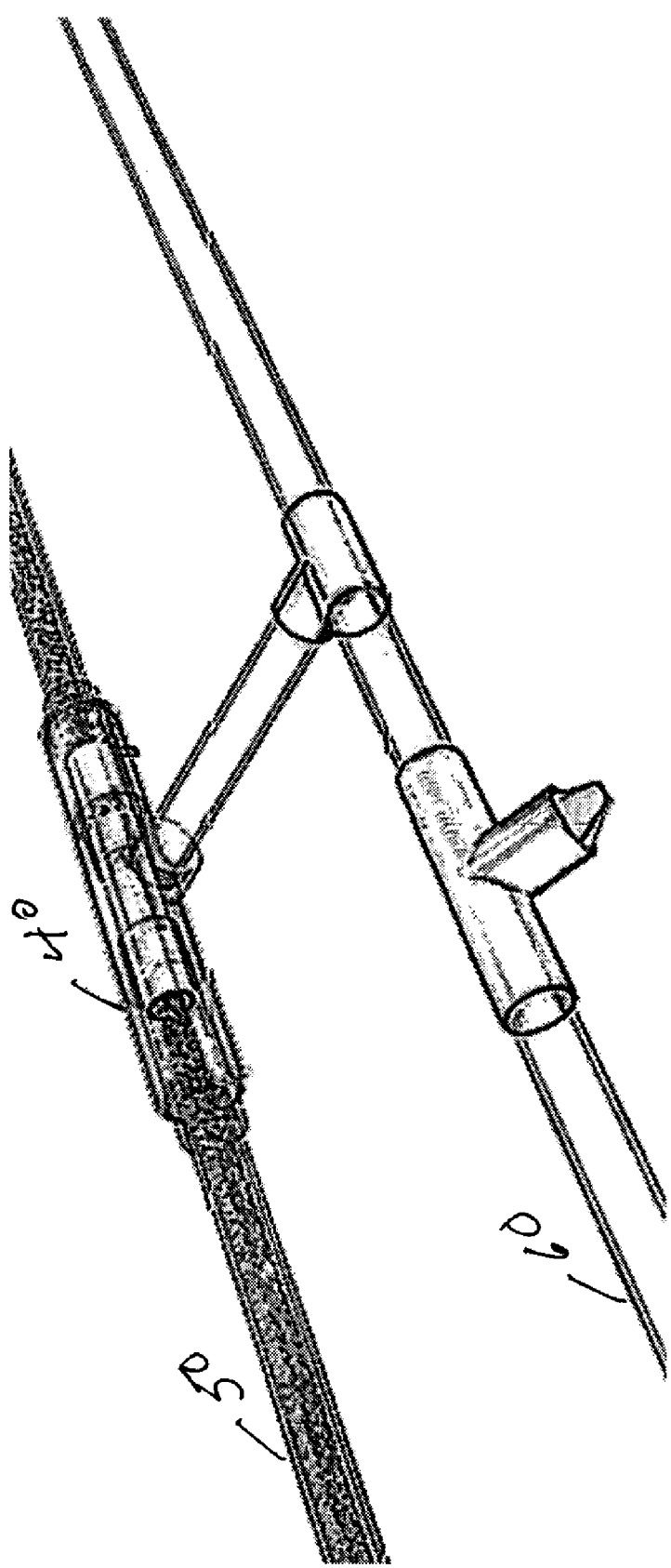
Figure 7:
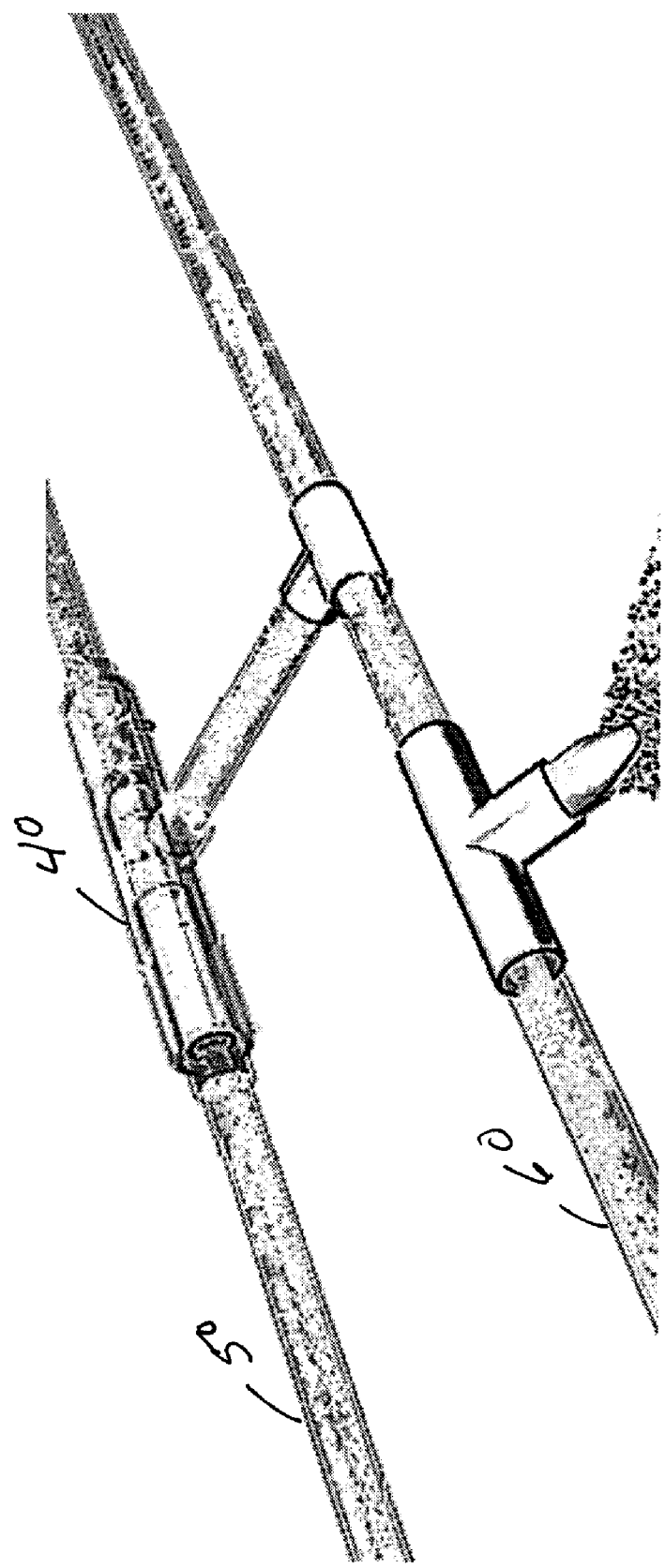

FIGS. 5-7 illustrate an application of the electromagnetic flow-through valve 40 to an external structure of a dwelling such as adjacent or attached to the roof gutters. The electromagnetic flow-through valve 40 is always in line with a wet line 50. The electromagnetic flow-through valve 40 fills the dry line 60 when one of the magnet cores is activated. Activating the magnet core results in the valve core 5 being pulled towards the activated magnet core and the dry line 60 being filled with water. When the water needs to be shut off, the second magnet core is activated thereby magnetically drawing the valve core towards the second magnet core.

Although the electromagnetic flow-through valve has been described in the context of a fire suppression sprinkler system, it can be adapted for use in other applications including irrigation of lawns and gardens close by its installation.

Those skilled in the art will appreciate that many modifications to the exemplary embodiment are possible without departing from the spirit and scope of the present invention. In addition, it is possible to use some of the features of the present invention without the corresponding use of the other features. Accordingly, the foregoing description of the exemplary embodiment is provided for the purpose of illustrating the principles of the present invention and not in limitation thereof since the scope of the present invention is defined solely by the appended claims.

What is claimed:

1. An electromagnetic valve assembly for controlling the flow of a fluid in a sprinkler system, comprising:
    a flow-through valve core including a plurality of orifices for a passage of fluid therethrough;
    a directional housing enclosing the valve core and enabling a controllable, lateral movement of the valve core in the directional housing from a closed position to an open position, the directional housing including an opening for the passage of fluid externally from the valve assembly to the sprinkler system;
    a plurality of seals positioned within the directional housing to prevent leakage of the fluid;
    a plurality of tubular magnet cores attached adjacent to the directional housing, each magnet core generating an electromagnetic field when actuated by means of an electrical current;
    wherein the generated electromagnetic field when applied to a first tubular magnet core causes the valve core to slide laterally towards and into the first tubular magnet core to an open position enabling the flow of fluid through the orifices of the valve core and through the opening of the directional housing; and
    wherein the generated electromagnetic field when applied to a second tubular magnet core causes the valve core to slide laterally towards and into the second tubular magnet core to a closed position stopping the flow of fluid through the orifices of the valve core and the opening of the directional housing.

2. The electromagnetic valve assembly of claim 1 wherein the valve core is hollow and cylindrical.

3. The electromagnetic valve assembly of claim 2 wherein the plurality of orifices are located on an outer surface of the valve core.

4. The electromagnetic valve assembly of claim 1 wherein the valve core comprises a magnetic material.

5. The electromagnetic valve assembly of claim 1 further comprising a thermoplastic valve casing that encloses the valve core, directional housing and magnet cores.

6. The electromagnetic valve assembly of claim 5 wherein the casing comprises a material from a group including polyvinyl chloride (PVC), acrylnitrile-butadiene-styrene (ABS), chlorinated polyvinyl chloride (CPVC), and polyvinylideneflouride (PVDF).

7. The electromagnetic valve assembly of claim 1 further comprising a plurality of valve core stoppers attached at each end of the valve assembly to an associated tubular magnet core, each valve core stopper limiting a movement of the valve core in a lateral direction into the associated tubular magnet core when an electromagnetic field is generated.

8. The electromagnetic valve assembly of claim 1 wherein each of the plurality of magnet cores is hollow to drive the valve core into an associated magnet core when the magnet core is activated.

9. An electromagnetic flow-through sprinkler valve for directing a flow of fluid to an external area upon receiving an electrical signal for actuation from a sensor, comprising:
    a flow-through valve core including a plurality of orifices around an outer surface for a passage of fluid therethrough;
    a directional housing including an outlet for at an external directional dispersal of fluid from a sprinkler when the orifices of the valve core are aligned with the outlet, the directional housing enclosing the valve core and enabling lateral movement of the valve core in the directional housing; and
    a plurality of tubular magnet cores attached adjacent to the directional housing on opposite ends of the housing, a first tubular magnet core generating an electromagnetic field when an electrical current is applied to the the first tubular magnet core in response to the electrical signal from the sensor, causing the valve core to move laterally towards and into the first tubular magnet core and enabling the flow of fluid through the orifices of the valve core and through the outlet of the directional housing.

10. The electromagnetic flow-through sprinkler valve of claim 9 wherein, when an electrical current is applied to the wire winding on a second tubular magnet core in response to another electrical signal from the sensor, the generated electromagnetic field causes the valve core to slide laterally towards and into the second tubular magnet core stopping the flow of fluid through the orifices of the valve core.

11. The electromagnetic flow-through sprinkler valve of claim 9 further comprising a plurality of seals positioned within the directional housing to prevent leakage of the fluid.

12. The electromagnetic flow-through sprinkler valve of claim 9 further comprising a valve casing that encloses the valve core, directional housing and magnet cores.

13. The electromagnetic flow-through sprinkler valve of claim 12 wherein the valve casing comprises a thermoplastic material.

14. The electromagnetic flow-through sprinkler valve of claim 13 wherein the thermoplastic material comprises any one of polyvinyl chloride (PVC), acrylnitrile-butadiene-styrene (ABS), chlorinated polyvinyl chloride (CPVC), and polyvinylideneflouride (PVDF).

15. The electromagnetic flow-through sprinkler valve of claim 9 further comprising a plurality of valve core stoppers attached at each end of the electromagnetic flow-through sprinkler valve to an associated magnet core, each valve core stopper limiting a movement of the valve core in a lateral direction into the associated magnet core when an electromagnetic field is generated.

16. The electromagnetic flow-through sprinkler valve of claim 9 wherein the valve core comprises a magnetic material.

* * * * *